STEREOPHONIC INDICATOR AND AUTOMATIC SWITCHING MEANS

Filed Oct. 1, 1964 2 Sheets-Sheet 1

INVENTOR
WILLIAM H. ELIAS
Thomas A. Briody
HIS ATTORNEY

STEREOPHONIC INDICATOR AND AUTOMATIC SWITCHING MEANS

Filed Oct. 1, 1964 2 Sheets-Sheet 2

INVENTOR
WILLIAM H. ELIAS
Thomas A. Briody
HIS ATTORNEY 3,294,916

STEREOPHONIC INDICATOR AND AUTOMATIC SWITCHING MEANS

William Hubert Elias, Decatur, Ill., assignor to General Electric Company, a corporation of New York Filed Oct. 1, 1964, Ser. No. 400,735
9 Claims. (Cl. 179—15)

Figure 1:
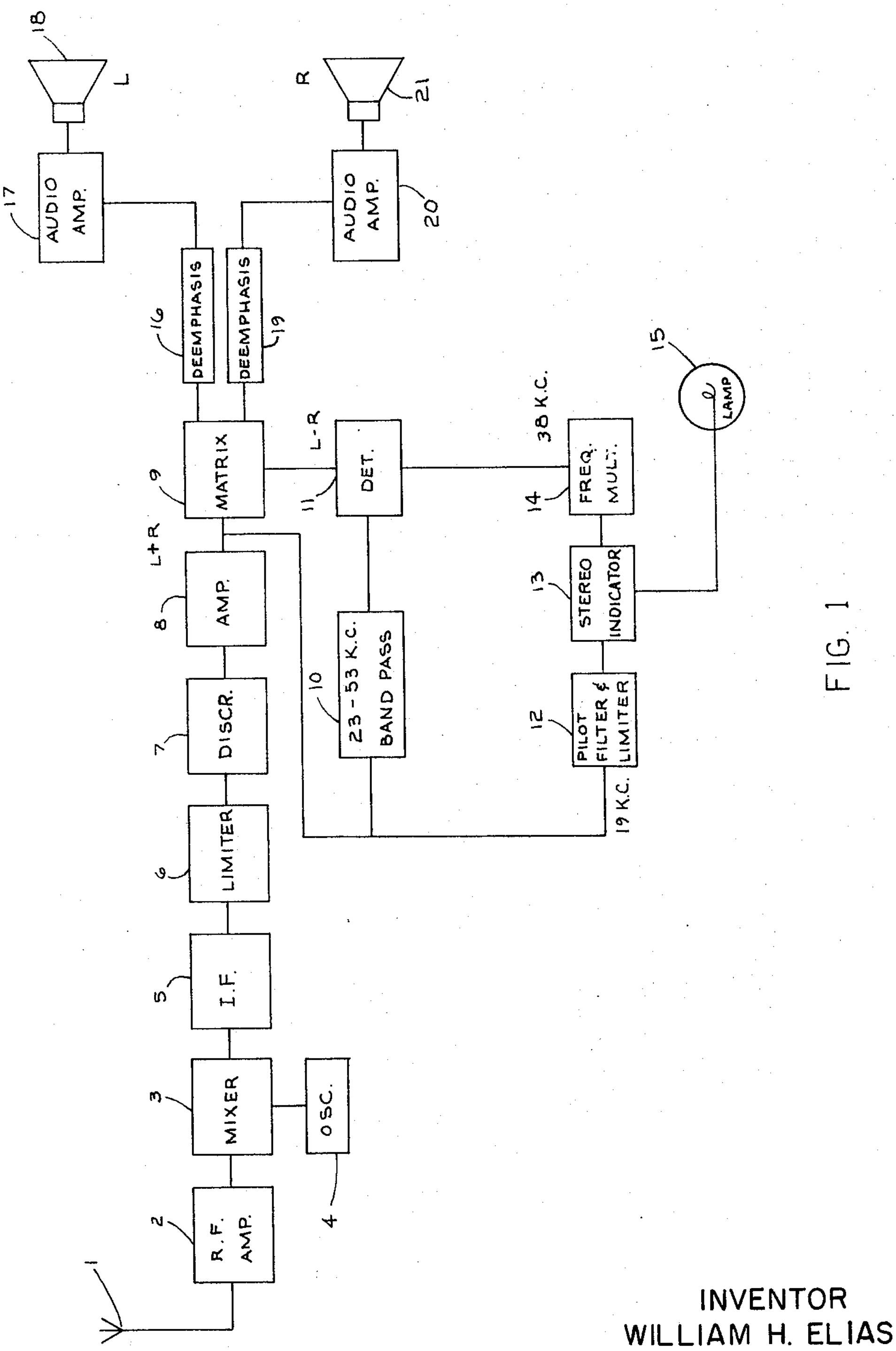

The present invention relates to stereophonic multiplex transmission and specifically it concerns a means for providing a visual indication at a receiver that stereo is being transmitted and for automatically switching the receiver into stereo operation.

The stereophonic multiplex transmission system of this general type includes a carrier wave on which is frequency modulated the sum of a left hand L and a right hand R signal. The difference of the L and R signals is amplitude modulated on a subcarrier which is then suppressed and not transmitted. The L—R signal represented by the side bands of the suppressed subcarrier is frequency modulated on the main carrier wave. A pilot signal is transmitted along with the L+R and the L—R signals at a frequency lying in the frequency gap between the latter two signals. Commonly, the L+R signals range between 0 and 15 kc. and the L—R signals range between 23 and 53 kc. The suppressed subcarrier is located at mid-range of the L—R signal or at 38 kc. and the pilot signal is of a frequency equal to one-half that of the suppressed subcarrier signal or 19 kc.

At the receiver the L+R signal is demodulated from the carrier and may be fed directly into a matrix circuit. The 19 kc. pilot signal is filtered from the composite signal and is fed to a frequency doubler which forms the 38 kc. subcarrier to be reinserted in the L—R signal. Upon reinsertion of the subcarrier, the L—R signal is demodulated and is fed into the previously-mentioned matrix circuit. The matrix circuit, by proper electronic arithmetic operations, reforms the L and R signals which are then fed to separate audio circuits to give a stereophonic effect to the listener. A stereophonic multiplex system as generally described in the previous paragraph is specifically disclosed and claimed in Csicsatka Patent No. 3,122,610, issued on February 25, 1964, and assigned to the assignee of the present invention.

In stereophonic multiplex systems of this type it is often desirable to provide a visual indication at the receiver that stereo is being transmitted and also to effect an automatic switching action from monaural to stereo operation. A common way of providing stereo indication and automatic stereo switching is by filtering and detecting the 19 kc. pilot signal which is present only during stereo transmission. It is very difficult, however, to design an indicator and automatic switcher of this type that does not have some spurious responses. This is because a very sensitive receiver will pick up noise when tuning between stations. Since this noise is completely random, it contains all frequencies including 19 kc., the pilot signal frequency. Thus, it is possible for the 19 kc. components of this noise to pass through the 19 kc. tuned circuits in the receiver and cause a stereo indicator to turn on, thereby giving a false indication. Likewise, the receiver could be switched into stereo operating during times when only a monaural signal is being transmitted, causing a decrease in quieting sensitivity which results in an increase of noise on relatively weak signals. Thus, as the pilot amplitude can fluctuate slightly, the receiver could repetitively switch back and forth between stereo and monaural operation, thereby causing unpleasing sounds to come from the amplifier.

One method presently used to provide stereo indication is by producing a harmonic of the pilot frequency and then creating a frequency slightly separated from this harmonic of the pilot frequency to produce an audible beat frequency. This system requires expensive harmonic generators and does not provide a visual indication. Another method for stereo indication is to provide an incandescent lamp with thermal delay characteristics such that continuous reception of a pilot signal turns on the lamp while short duration noise pulses will not. This system does not give sufficient delay to eliminate spurious response, nor does it prevent repetitive switching between monaural and stereo modes of operation when certain conditions occur. The only known automatic stereo switching means involves the utilization of a relay sensitive to the frequency of the subcarrier. When energized, the relay closes a circuit containing the stereo components and additionally causes an indicating lamp to be illuminated. This system is unsatisfactory because it is completely vulnerable to spurious responses due to noise. The present invention has found it advantageous to combine the desirable features of visible stereo indication and automatic stereo switching. These features are provided in a circuit which is completely reliable and insensitive to noise. In addition, to prevent undesirable repetitive switching between monaural and stereo modes of operation, this invention provides a positive holding action for locking the receiver on stereo operation after the initial switch to stereo.

Accordingly, it is an object of this invention to provide a stereophonic receiver which is insensitive to random noise pulses of the same frequency as that of the pilot signal.

Another object is to provide a stereophonic receiver which is automatically switched to stereophonic operation upon the reception of a pilot signal indicating stereophonic transmission and which at the same time is relatively insensitive to noise signals.

Another object of my invention is to provide a stereophonic receiver which provides a positive holding action for locking the system into stereo operation after the system is initially switched into stereo operation.

These and further objects and advantages of the present invention are achieved, in one form, in a circuit which, after limiting high amplitude pilot signal and noise pulses, integrates the signal. Pulses which are relatively short in duration produce an integrated signal which is relatively low and which will not therefore operate either an indicator or a switch. Since a true pilot signal is more continuous in nature than noise, its average value will be greater than the average value of the noise to such an extent that the indicator and/or switch may operate. Finally, a positive feedback circuit acts to increase the circuit gain after initial switching into stereo operation. This increased gain locks the system on stereo and prevents repetitive switching back and forth between stereo and monaural operation.

Figure 2:
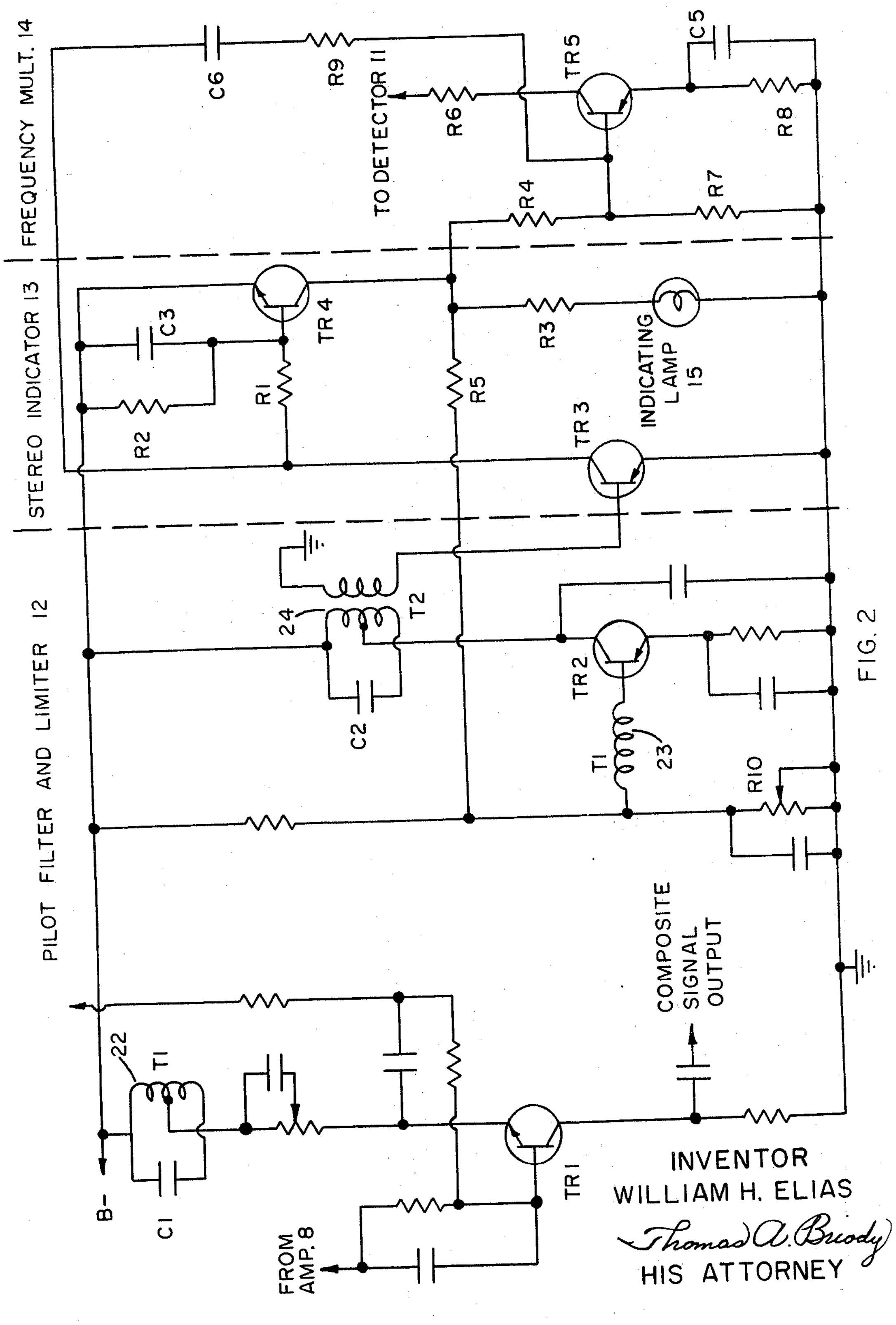

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIGURE 1 is a block diagram of a typical stereo receiver which incorporates one embodiment of my invention; and FIGURE 2 is a detailed circuit diagram of the elements of FIGURE 1 which encompass my invention.

Referring first to FIGURE 1 there is shown the path through which the composite stereo signal travels, beginning with a receiver antenna 1 connected through a radio frequency amplifier 2 to a mixer 3 to which a local oscillator 4 is connected. The output of the mixer is connected through an intermediate frequency amplifier 5 and a limiter 6 to a discriminator 7. The receiver thus far described is conventional and need not be further discussed, as its operation is well-known to those skilled in the art.

An amplifier 8 may be connected to the output of discriminator 7. The L+R component of the output of amplifier 8, is fed to a matrix circuit 9. The output of amplifier 8 is also connected, via a band-pass filter 10 having a frequency-pass range of 23–53 kc., to a detector 11. The output of amplifier 8 is additionally sent to detector 11 through a pilot filter and limiter 12, stereo indicator 13, and frequency multiplier 14. These last three mentioned elements constitute an important aspect of the present invention.

An indicator lamp 15 is connected to stereo indicator 13. Frequency multiplier 14 comprises a frequency doubler and functions to send a 38 kc. signal to detector 11. Detector 11 demodulates the 23–53 kc. sidebands of the 38 kc. subcarrier to form the L−R signal. The output of detector 11, which is the L−R signal, is sent to matrix 9 where the L and R signals are reproduced. The L signal is sent through a de-emphasis network 16 and audio amplifier 17 to a left hand loudspeaker 18 which is preferably positioned relatively to the left of the listener. The R signal is applied through a de-emphasis network 19 and audio amplifier 20 to a loudspeaker 21 which is preferably placed relatively to the right of the listener.

Now referring to FIGURE 2, which shows circuit details of the blocks 12, 13, and 14 of FIGURE 1, the composite signal from the amplifier 8 is applied to the base of transistor TR1 which is an emitter follower acting to transform from a high input impedance to a low output impedance. The operation of transistor TR1 is well-known and does not form a part of the present invention. The composite signal at the emitter output electrode of transistor TR1 is filtered through a tuned circuit consisting of the parallel combination of capacitor C1 and an inductor. The inductor forms the primary winding 22 of a transformer T1. This tuned circuit selects the pilot signal, in this case a signal having a frequency of 19 kc., out of the composite signal and is part of the pilot filter 12 illustrated in FIGURE 1. The pilot signal thus filtered from the composite signal is coupled via transformer T1 to the base electrode of a transistor amplifier TR2 by means of a secondary winding 23. The biasing resistors and their by-pass capacitors shown in the emitter circuit of transistor amplifier TR2 are also conventional and likewise do not necessarily form an essential part of the present invention.

The amplified output of transistor amplifier TR2 is coupled to the base of a transistor limiter TR3 via another tuned circuit consisting of the parallel combination of capacitor C2 and the primary winding 24 of a coupling transformer T2. Transistor limiter TR3 is operated in such a manner that its collector cut-off voltage is the B− supply voltage of −12 volts and its saturation voltage is approximately .2 volt. The output at the collector electrode of transistor amplifier TR2 consisting of both the pilot signal and the 19 kc. noise pulses is, therefore, limited to the range between .2 volt and −12 volts.

The limited output at the collector electrode of transistor limiter TR3 is connected to the base electrode of transistor switch TR4 through a resistor R1. To help prevent high amplitude noise pulses from being incorrectly taken as the pilot signal, an integrating circuit, consisting of the parallel combination of resistor R2 and capacitor C3, is connected across the base and emitter electrodes of transistor switch TR4. The output of this integrating circuit is the direct current average of the output of transistor limiter TR3, which will be higher when the pilot signal is present than when this output comprises only noise. Transistor switch TR4 changes its conductive state to this higher direct current average and, therefore, is responsive only to the pilot signal.

To provide an effective visual indication of stereo transmission, the output at the collector electrode of transistor switch TR4 is connected through resistor R3 to an incandescent lamp. The output of transistor switch TR4 is also connected through resistor R4 to the base of a transistor frequency doubler TR5 to bias the latter into conduction upon the receipt of a pilot signal. To provide the 19 kc. pilot signal needed by transistor frequency doubler TR5 in order to produce the 38 kc. subcarrier, a connection is provided between the collector electrode output of transistor limiter TR3 and the base of transistor frequency doubler TR5 through capacitor C6 and resistor R9. The 38 kc. signal at the collector electrode output of transistor frequency doubler TR5 is conducted via the resistor R6 to the L−R detector 11 (not shown in FIGURE 2). Transistor frequency doubler TR5 is conventional and is biased by resistors R4, R7, R8, and capacitor C5 in such a manner that it is allowed to conduct only when TR4 has been switched on.

To increase the overall circuit gain and provide the positive hold-on action, the output of transistor switch TR4 is fed back through resistor R5 to the biasing circuit for transistor amplifier TR2.

For effectively adjusting the quiescent gain of the 19 kc. circuits to allow for variations in discriminator output, as further shown in FIGURE 2, the resistor 10 has been utilized.

In operation, the action of the 19 kc. filters made up of elements C1, T1, C2 and T2, is to present a signal at the base of transistor amplifier TR2 and transistor limiter TR3 composed only of the pilot signal and the 19 kc. component of random noise. It is a characteristic of random noise to have pulses of large amplitudes followed by pulses of relatively small amplitudes. The initial amplitudes of these noise pulses are commonly larger than the amplitude of the pilot signal. Since transistor limiter TR3 cuts off at a fixed value, the high amplitude pulses are limited at this value. Resistors R1 and R2 act as load resistors for transistor limiter TR3 and form a voltage divider network to supply bias voltage to the transistor switch TR4. The limiting action of transistor TR3 insures that no extra high amplitude noise pulses will be able to create a voltage at the junction of resistors R1 and R2 sufficient to bias the transistor switch TR4 into conduction. Capacitor C3 integrates the noise pulses or the pilot signal to present a direct current average value to the base of transistor switch TR4. Since the noise pulses are characterized by large amplitude pulses followed by relatively small amplitude pulses, the direct current average value of the noise will be relatively small. On the other hand, the pilot signal is continuous in nature so that the direct current average value will be relatively large as compared with the average value of the noise. By this integrating action and by proper selection of the values of biasing resistors R1 and R2, transistor switch TR4 is not rendered conductive unless a true pilot signal is present at the output of transistor limiter TR3. By way of example, in one operating form of this invention, values of 1000 ohms for resistor R2 and 3300 ohms for resistor R1 are effective with a 2N2926 type transistor chosen as transistor switch TR4.

When a 19 kc. pilot signal is being transmitted and transistor switch TR4 is rendered conductive, a direct current output from this transistor is supplied through resistor R3 to an incandescent indicating lamp 15, which then becomes illuminated to provide a visual indication that stereo transmission is being received. The direct current output of transistor switch TR4 is also used to bias transistor frequency doubler TR5 into conduction. When transistor frequency doubler TR5 conducts, the 19 kc. pilot signal, which is supplied from the collector electrode of transistor limiter TR3 through capacitor C6 and resistor R9, is doubled to a 38 kc. signal. This 38 kc. signal is sent from the collector electrode of transistor frequency doubler TR5 to the L−R detector and, in this manner, the receiver is automatically switched into stereo operation.

The direct current output at the collector of transistor switch TR4 is also fed back through resistor R5 to the biasing network of transistor amplifier TR2 to increase its gain. Without this provision for a positive feedback, should the amplitude of a pilot signal fall to a lower value such that the direct current average value provided by capacitor C3 is too low to keep transistor switch TR4 conducting, the receiver may be switched out of stereo operation while stereo is still being received. By providing positive feedback through amplifier TR2, the gain of the entire circuit is increased, thus providing a positive hold-on action. It has been shown that the pilot signal amplitude may drop to approximately one-half the amplitude that was needed for initial conduction before transistor switch TR4 ceases to conduct.

While the illustrated embodiment of the present invention has been described in terms of a 19 kc. pilot signal, the invention is not limited to such an arrangement, but can be employed advantageously in any stereo multiplex system involving the transmission of a pilot signal which is a subharmonic of a suppressed subcarrier signal. Whatever frequency pilot signal is utilized, the problems of spurious noise response may be present, but will be effectively eliminated by the teachings of the present invention.

Also, no matter what the frequency of the suppressed subcarrier signal, the present invention provides an automatic switching of the receiver into stereo operation.

While in accordance with the patent statutes, I have described what at present is considered to be the preferred embodiment of the present invention, it will be obvious to those skilled in the art that various changes and modifications may be made therein without departing from the invention, and I, therefore, aim in the following claims to cover all such equivalent variations that fall within the true spirit and scope of this invention.

What I claim as new and desire to secure by Letters Patent of the United States is:

1. An indicating circuit for a stereo system including a pilot signal comprising: means for amplifying said pilot signal, transistor means for limiting the output of said amplifying means; means for integrating the output of said transistor means to obtain a direct current average value thereof; and a transistor switching means responsive to the integrated output of said transistor means.

2. An indicating circuit for a stereo system including a pilot signal comprising: means for selecting the pilot signal means for amplifying said pilot signal, transistor means for limiting the output of said amplifying means; means for integrating the output of said transistor means to obtain a direct current average value thereof; said average value rising above a predetermined value only in the presence of said pilot signal; and a transistor switching means responsive only to said average value above said predetermined value.

3. An indicating circuit for a stereo system including a pilot signal comprising: means for selecting said pilot signal, means for amplifying said pilot signal, transistor means for limiting the output of said amplifying means; means for integrating the output of said transistor means to obtain a direct current average value thereof; said average value rising above the predetermined value only in the presence of said pilot signal; transistor switching means normally nonconducting and being rendered conductive only in response to said average value above said predetermined value; and an indicating device responsive to conduction of said transistor switching means.

4. The circuit as set forth in claim 5 wherein said indicating device comprises an incandescent lamp.

5. An indicating circuit for a stereo system including a pilot signal comprising: means for selecting the pilot signal, means for amplifying said pilot signal, transistor means for limiting the output of said amplifying means; means for integrating the output of said transistor means to obtain a direct current average value thereof; said average value rising above a predetermined value only in the presence of said pilot signal; transistor switching means normally nonconducting and being rendered conductive only in response to said average value above said predetermined value; and means to switch said stereo system into stereo operation in response to conduction of said transistor switching means.

6. The circuit as set forth in claim 7 wherein said means to switch said stereo system into stereo operation in response to conduction of said transistor switching means comprises a frequency doubler.

7. An indicating circuit for a stereo system including a pilot signal comprising: means for selecting said pilot signal, means for amplifying said pilot signal; transistor means for limiting the output of said amplifying means; means for integrating the output of said transistor means to obtain a direct current average value thereof, said average value rising above a predetermined value only in the presence of said pilot signal; a transistor switching means normally nonconducting and being rendered conductive only in response to said average value above said predetermined value; and feedback means between the output of said transistor switching means and the input of said amplifying means for increasing the gain thereof after initial conduction of said transistor switching means.

8. An indicating circuit for a stereo system including a pilot signal comprising: means for selecting said pilot signal, means for amplifying said pilot signal, transistor means for limiting the output of said amplifying means; means for integrating the output of said transistor means to obtain a direct current average value thereof; said average value rising above a predetermined value only in the presence of said pilot signal; a transistor switching means normally nonconducting and being rendered conductive only in response to said average value above said predetermined value; feedback means between the output of said transistor switching means and the input of said amplifying means for increasing the gain thereof after initial conduction of said transistor switching means, said increased gain being sufficient to cause said direct current average value to remain above said predetermined value should the amplitude of said pilot signal fall below that necessary for initial conduction of said transistor switching means.

9. An indicating circuit for a stereo system including a pilot signal comprising: a transistor amplifier connected in the common emitter configuration and including a first input and a first output circuit, said first input circuit being tuned to the frequency of said pilot signal, said first output circuit also being tuned to the frequency of said pildot signal; a transistor limiter connected in the common emitter configuration and including second input and output circuits, said second input circuit being transformer coupled to said first output circuit, said transistor limiter acting to limit noise signals of the same frequency as said pilot signal but of larger amplitude; a transistor switch connected in the common emitter configuration and including third input and output circuits, said third input circuit being connected to said second output circuit through a first resistor; an integrating circuit connected across said third input circuit for obtaining a direct current average value of said pilot signal and said noise signals comprising a second resistor and a capacitor connected in parallel; said transistor switch being normally nonconducting but being rendered conductive whenever a pilot signal of sufficient amplitude is present; indicating means connected to said third output circuit and responsive to conduction of said transistor switch; a transistor frequency doubler including fourth input and output circuits and connected in the common emitter configuration, said fourth input circuit being connected through a third resistor to said third output circuit, said fourth input circuit also being connected to said second output circuit, said fourth output circuit connected to a detector means which functions only in response to a signal of frequency equal to twice that of said pilot signal; and a feedback circuit connected between said third output circuit and said first input circuit and acting to present positive feedback to said transistor amplifier to increase its gain such that said transistor switch remains conductive should the amplitude of said pilot signal fall slightly below said sufficient amplitude necessary for initial conduction.

References Cited by the Examiner

UNITED STATES PATENTS

| | | | |
|---|---|---|---|
| 3,133,993 | 5/1964 | De Vries | 179—15 |
| 3,235,663 | 2/1966 | Plus et al. | 179—15 |

References Cited by the Applicant

UNITED STATES PATENTS

| | | |
|---|---|---|
| 3,105,117 | 9/1963 | Frank. |
| 3,116,372 | 12/1963 | Wolff. |
| 3,125,640 | 3/1964 | Von Recklinghausen. |
| 3,125,641 | 3/1964 | Von Recklinghausen. |

DAVID G. REDINBAUGH, *Primary Examiner.*

R. L. GRIFFIN, *Assistant Examiner.*